Dec. 10, 1929.  F. VAN N. EICK  1,739,131
HOSE COUPLING
Filed May 31, 1924
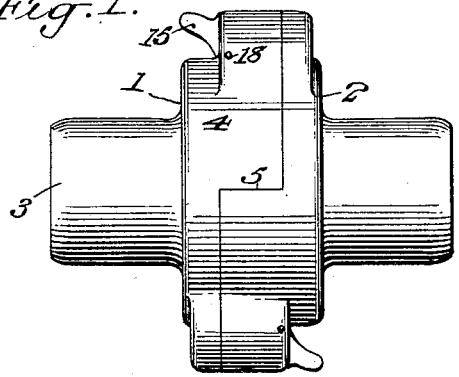
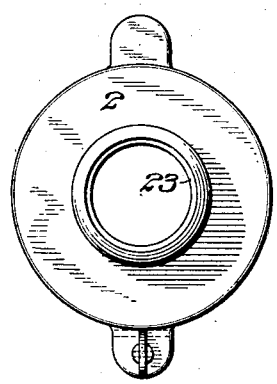
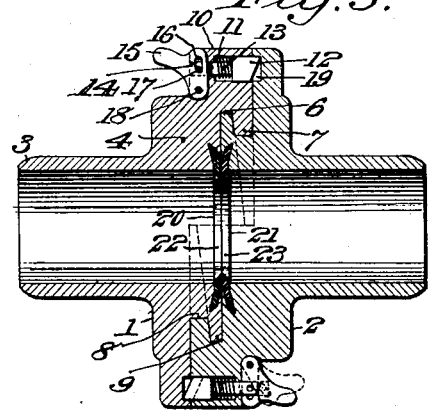
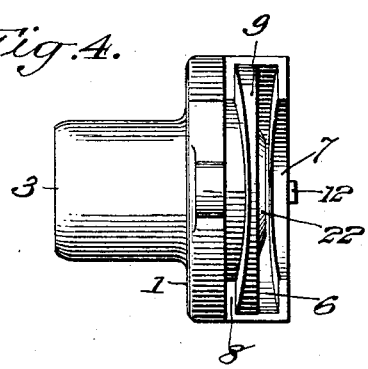
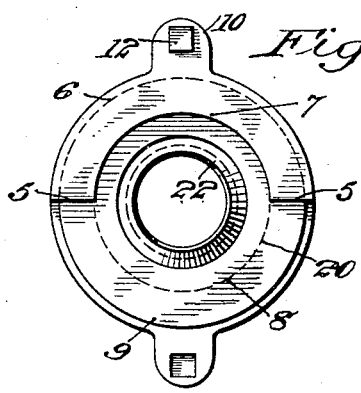
INVENTOR
Frederick Van Ness Eick
BY
his ATTORNEYS Patented Dec. 10, 1929

1,739,131

UNITED STATES PATENT OFFICE

FREDERICK VAN NESS EICK, OF BEDMINSTER, NEW JERSEY

HOSE COUPLING

Application filed May 31, 1924. Serial No. 717,064.

This invention relates to an improved hose coupling and has for an object to provide such a device which may be very rapidly and easily engaged and disengaged.

Another object consists in providing such a device which is positively locked in engaged position.

Another object consists in providing such a device which has manually operable means for unlocking the parts to permit them to be disengaged.

Another object consists in providing such a device which has means for forming a very tight union between the engaging parts, the tightness of said union being enhanced by the flow of fluid through the coupling.

Another object consists in providing certain improvements in the form, construction and arrangment of the several parts, whereby the above named and other objects may effectively be attained.

A practical embodiment of the invention is represented in the accompanying drawings, in which Fig. 1 represents a side elevation of the parts in engaged position.

Fig. 2 represents an end view thereof.

Fig. 3 represents a longitudinal section therethrough.

Fig. 4 represents a side elevation of one of the parts of the coupling.

Fig. 5 represents a face view of the same, turned at a angle of 90° to the position shown in Fig. 4.

The coupling comprises two main parts or members 1, 2, and, as each of these members is exactly like its mate, it will suffice to describe one in detail.

Referring to the member 1, it includes a nipple 3 which is adapted for engagement with the end of a hose by insertion of the nipple within the hose in a well understood manner.

The said member also includes a body portion 4 which is considerably larger in diameter than the nipple 3, and is fashioned so as to embody grooves and ribs for engagement with the complementary member of the coupling.

One-half portion of the body 4 projects in an axial direction further away from the nipple 3 than the other half, as clearly shown in Figs. 4 and 5, the said projecting portion therefore terminating in axially extending walls 5, which are diametrically opposed to each other.

This projecting portion has an undercut groove 6 which begins and ends at the walls 5. It is semi-annular in general shape and is gradually reduced in its axial depth from each wall 5 toward its center, thereby constituting, in effect, a double wedge shaped groove, which is bounded on one side by a curved rib 7 that is also double wedge shaped at its inner surface as a result of the shape of the groove 6 just described. Where the groove 6 is narrowest in axial direction, the rib 7 is widest, as clearly shown in Fig. 4.

The half of the body 4 which is opposite the groove 6 and rib 7, just described, also includes a semi-annular grove 8, which begins and ends at the walls 5, but this groove grows greater in its axial dimension from each end toward the middle so that it is widest at a point diametrically opposite to the narrowest point in the groove 6.

A rib 9 bounds the groove 8 on one side and is formed so as to be widest in an axial direction at its ends, so that its narrowest portion coincides with the widest portion of the groove 8. This formation of the groove 8 and rib 9 is clearly shown in Fig. 4.

The surfaces which bound the grooves 6 and 8 on their sides nearest to the nipple 3 are flat and arranged at right angles to the axis of the coupling member. The outer face of the rib 7 is also flat.

As already mentioned, the other member of the coupling 2 is formed exactly like the member 1 just described, and the result of this construction is that the two members may be slipped together by a straight line movement at right angles to the axis of the coupling as a whole. In this movement, the ribs on the one member will fit into the grooves on the other member, and vice versa, the shapes of the ribs and grooves being such as to impart a wedging action as the members are moved together in the manner just described, thereby forming a very tight interlocking engagement.

Mechanism is also provided for positively locking the two members in engaged assembly and, as these two mechanisms are identical, one being provided for each member of the coupling, it will only be necessary to describe one.

The body portion 4 of the member 1 has an ear 10 which projects in a radial direction from the outer periphery thereof and is bored, as shown at 11, to receive a spring latch 12 which has an expansion coil spring 13 surrounding its shank and housed between its enlarged head and the base of the bore 11. The rear end of the shank of the latch 12 is bifurcated and extends entirely through the ear 10, as shown in dotted lines at 14. Within the bifurcation is fitted a thumb piece 15 which has an elongated aperture 16 that is traversed by a pin 17 which passes through both parts of the bifurcated end of the latch 12. The thumb piece 15 is pivoted at 18 in the body portion 4 of the member 1, and it will be seen that manual depression of the thumb piece 15 will cause it to swing about its pivot 18 and withdraw the latch 12 against the resilient action of the spring 13.

The member 2 is provided with a recess 19 that registers with the bore 11 when the two members of the coupling are in assembly and is intended to receive the projecting end of the latch 12, which end is bevelled after the manner of ordinary door latches.

As already mentioned, the member 2 of the coupling is provided with locking mechanism exactly like that just described and the member 1 has a recess for the projecting end of the latch just as set forth in connection with the member 2.

In the light of the foregoing description, it will be seen that the sliding movement already described as being imparted when uniting the two members of the coupling, will not only bring the said members to a firm position of interlocking engagement, but will also actuate the locking mechanism in a manner quite analogous to that of closing a door and thus cause the latch 12 to be seated in the recess 19 and corresponding action to take place in respect to the other latch. The result will be to positively lock the members of the coupling in engaged position so as to prevent accidental displacement or even loosening of the mutual contact of the members.

When it is desired to uncouple the members, it is merely necessary to depress the thumb pieces 15, which will serve to withdraw the latches, and then pull the two members 1 and 2 apart following a straight line of movement normal to the axis of the coupling as a whole.

It will be seen from the foregoing that the coupling and uncoupling of the members is accomplished in an exceedingly simple manner, since it only requires, in each case, a single relative movement of the parts.

In order better to insure a fluid tight engagement, each member of the coupling has a groove and washer of a certain form. This construction is clearly shown in Fig. 3, and it will be noted that each member 1 and 2 has a circular groove 20, 21 which are formed adjacent the interior meeting faces of the two members. These grooves are arranged at an acute angle to the axis of the members when considered in a direction toward the nipples on each member, that is to say, each groove recedes at less than a right angle from the axis of the coupling as a whole toward the nipple on the member in which the groove is formed.

A washer 22, 23 is mounted in each groove, the said washer being of sufficient width to project slightly within the central bore or passage way of the coupling members. These washers are preferably flat, annular washers, composed of some material such as vulcanized rubber compound, and having beveled outer edges.

The angular arrangement of the grooves 20, 21 is such as to cause the projecting inner faces of the washers to abut each other, as plainly illustrated in Fig. 3.

When the fluid is passing through the central bore or passage of the coupling as a whole, it will impinge upon the inner projecting edges of the said washers and press one against the other, thereby insuring a very tight fit and preventing leakage at the joint of the coupling members. It makes no difference in which direction the flow takes place, the same result will be obtained because, in either case, one of the washers will be forced directly against its neighbor. Additionally it may be found desirable to have the washers of such thickness that they will be pressed into sealing engagement simply by uniting the coupling members, which result obtains by reason of the beveled form of ribs and grooves.

I desire it to be understood that various changes may be resorted to in the form, construction, composition and arrangement of the several parts without departing from the spirit and scope of my invention, and hence I do not intend to be limited to the details herein shown and described, except as they may be included in the claims.

What I claim is:

1. A hose coupling of the character described comprising, homologous complementary members adapted to be united by relative movement in a direction substantially normal to their axes, each of said members having a plurality of semi-annular ribs and grooves tapered in opposite directions from their middles, each of said ribs and grooves being bounded laterally by planes, and certain of said planes being inclined from normal to the axis of the member so as to give a tapering form to said ribs and grooves.

2. A hose coupling of the character described comprising, homologous complementary members adapted to be united by relative movement in a direction at an angle to their axes, each said member having a plurality of semi-annular ribs tapered in opposite directions from their middles, a semi-annular groove adjacent one of said ribs and tapered from narrow at its middle to wide at its ends, and a semi-annular groove adjacent another of said ribs and tapered from wide at its middle to narrow at its ends, said grooves being adapted for interengagement with ribs of the other said complementary member.

3. A hose coupling of the character described comprising, homologous complementary members adapted to be united by relative movement in a direction at an angle to their axes, each said member having a plurality of ribs, the lateral faces of one rib lying in planes parallel to the corresponding faces of another rib and the lateral faces of each rib being, themselves, out of parallelism, and each said member being provided with a plurality of grooves, the lateral walls of one groove lying in planes parallel to the corresponding walls of another groove and the lateral walls of each groove being, themselves, out of parallelism.

In testimony, that I claim the foregoing as my sole invention I have signed my name this 23 day of May, 1924.

FREDERICK VAN NESS EICK.